United States Patent [19]

Ueda

[11] Patent Number: 4,983,480
[45] Date of Patent: Jan. 8, 1991

[54] PHOTOSENSITIVE MEMBER COMPRISING AN AZO COMPOUND

[75] Inventor: Hideaki Ueda, Osaka, Japan

[73] Assignee: Minolta Camera Kabushiki Kaisha, Osaka, Japan

[21] Appl. No.: 291,208

[22] Filed: Dec. 28, 1988

[30] Foreign Application Priority Data

Dec. 29, 1987 [JP] Japan .................................. 62-334203

[51] Int. Cl.$^5$ ............................................. G03G 5/06
[52] U.S. Cl. ......................................... 430/58; 430/78
[58] Field of Search ..................... 430/58, 70, 72, 73, 430/74, 76, 78, 79

[56] References Cited

U.S. PATENT DOCUMENTS

| | | | |
|---|---|---|---|
| 4,032,339 | 6/1977 | Grushkin et al. | 430/76 |
| 4,062,854 | 12/1977 | Grushkin | 260/295 A |
| 4,123,270 | 10/1978 | Heil et al. | 430/78 |
| 4,272,598 | 6/1981 | Sasaki et al. | 430/72 |
| 4,396,695 | 8/1983 | Dimmler et al. | 430/59 |
| 4,396,696 | 8/1983 | Nagasaka et al. | 430/78 |
| 4,399,206 | 8/1983 | Katagiri et al. | 430/58 |
| 4,419,428 | 12/1983 | Katagiri et al. | 430/77 |
| 4,426,432 | 1/1984 | Sawada et al. | 430/58 |
| 4,515,881 | 5/1985 | Sawada et al. | 430/58 |
| 4,533,613 | 8/1985 | Kawamura et al. | 430/78 |
| 4,537,847 | 8/1985 | Takahashi et al. | 430/58 |
| 4,540,651 | 9/1985 | Fujimaki et al. | 430/72 |
| 4,554,231 | 11/1985 | Ishikawa et al. | 430/59 |
| 4,582,771 | 4/1986 | Ohta | 430/58 |
| 4,631,242 | 12/1986 | Emoto et al. | 430/58 |
| 4,647,520 | 3/1987 | Watanabe et al. | 430/58 |
| 4,663,442 | 5/1987 | Ohta | 534/759 |
| 4,672,149 | 6/1987 | Yoshikawa et al. | 136/263 |
| 4,687,721 | 8/1987 | Emoto et al. | 430/58 |
| 4,702,982 | 10/1987 | Matsumoto et al. | 430/72 |
| 4,716,220 | 12/1987 | Tsutsui | 534/738 |
| 4,743,523 | 5/1988 | Yamashita et al. | 430/59 |
| 4,760,003 | 7/1988 | Matsumoto et al. | 430/58 |
| 4,820,600 | 4/1989 | Akasaki et al. | 430/58 |

FOREIGN PATENT DOCUMENTS

| | | |
|---|---|---|
| 54-22834 | 2/1979 | Japan . |
| 55-117151 | 9/1980 | Japan . |
| 59-214034 | 12/1984 | Japan . |
| 60-19152 | 1/1985 | Japan . |
| 60-121451 | 6/1985 | Japan . |
| 61-272755 | 12/1986 | Japan . |
| 62-55662 | 11/1987 | Japan . |
| 62-55786 | 11/1987 | Japan . |
| 62-58505 | 12/1987 | Japan . |
| 62-59299 | 12/1987 | Japan . |

*Primary Examiner*—John L. Goodrow
*Attorney, Agent, or Firm*—Burns, Doane, Swecker & Mathis

[57] ABSTRACT

The present invention relates to a photosensitive member containing a specific azo compound for a charge generating material represented by the following general formula (I);

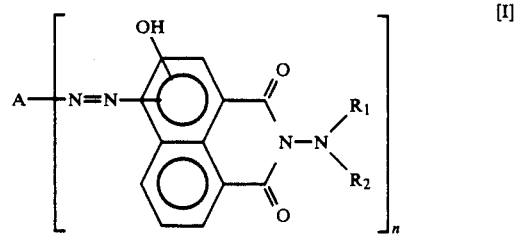

wherein A represents an aromatic hydrocarbon group or a heterocyclic group, which may be bonded through a bonding group; $R_1$ and $R_2$ are independently selected from the group consisting of hydrogen, a halogen atom, an alkyl group which may have a substitutent, an aralkyl group which may have a substitutent, an aryl group which may have a substituent, a condensed poly-cyclic group which may have a substitutent and a heterocyclic group which may have a substituent; $R_1$ and $R_2$ may combinedly form a cyclic ring; and n represents an integer of 1, 2, 3, or 4, which is improved in photosensitive properties, in particular, sensitivity.

11 Claims, No Drawings

PHOTOSENSITIVE MEMBER COMPRISING AN AZO COMPOUND

BACKGROUND OF THE INVENTION

This invention relates to a photosensitive member containing a new azo pigment.

Known photosensitive materials for forming a photosensitive member include inorganic photoconductive materials such as selenium, cadmium sulfide or zinc oxide.

These photosensitive materials have many advantages such as low loss of charges in the dark, an electrical charge which can be rapidly dissipated with irradiation of light and the like. However, they have disadvantages. For example, a photosensitive member based on selenium is difficult to produce, has high production costs and is difficult to handle due to inadequate resistivity to heat or mechanical impact. A photosensitive member based on cadmium sulfide has defects such as its unstable sensitivity in a highly humid environment and loss of stability with time because of the deterioration of dyestuffs, added as a sensitizer, by corona charge and fading with exposure.

Many kinds of organic photoconductive materials such as polyvinylcarbazole and so on have been proposed. These organic photoconductive materials have superior film forming properties, are light in weight, etc., but inferior in sensitivity, durability and environmental stability compared to the aforementioned inorganic photoconductive materials.

Various studies and developments have been in progress to overcome the above noted defects and problems. A function-divided photosensitive member of a laminated or a dispersed type has been proposed, in which charge generating function and charge transporting function are divided by different layers or different dispersed materials. The function-divided photosensitive member can be a highly efficient photosenistive member in electrophotographic properties such as chargeability, sensitivity, residual potential, durability with respect to copy and repetition, because most adequate materials can be selected from various materials. Further, function-divided photosensitive members have high productivity and low costs, since they can be prepared by coating, and suitably selected charge generating materials can freely control a region of photosensitive wavelength. Illustrative examples of such charge generating materials are organic pigments or dyes such as phthalocyanine pigment, cyanine pigment, polycyclic quinone pigment, perylene pigment, perinone pigment, indigo dye, thioindigo dye, squarain compounds, etc., and inorganic materials such as selenium, selenium-arsenic, selenium-tellurium, cadmium sulfide, zinc oxide, amorphous silicon, etc.

However, such photosensitive members, which satisfy general static property requirements, are not produced easily, and more improved sensitivity is desired.

SUMMARY OF THE INVENTION

The object of the invention is to provide a photosensitive member having excellent general static properties, in particular, sensitivity.

The present invention relates to a photosensitive member wherein a photosensitive layer containing an azo pigment represented by the general formula (I) is formed on or over an electroconductive substrate;

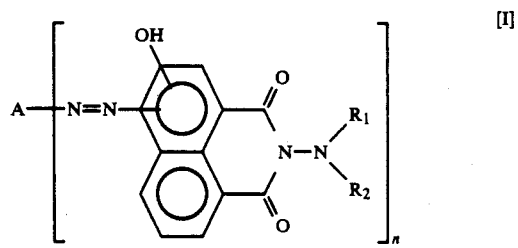

wherein A represents an aromatic hydrocarbon group or a heterocyclic group, which may be bonded through a bonding group; $R_1$ and $R_2$ are independently selected from the group consisting of hydrogen, a halogen atom, an alkyl group which may have a substituent, an aralkyl group which may have a substituent, an aryl group which may have a substituent, a condensed poly-cyclic group which may have a substituent and a hetero-cyclic group which may have a substituent; $R_1$ and $R_2$ may combinedly form a cyclic ring; and n represents an integer of 1, 2, 3, or 4.

DETAILED DESCRIPTION OF THE INVENTION

The present invention provides a photosensitive member, having excellent electrophotographic properties, in particular, sensitivity.

The present invention has accomplished the above object by the introduction of a specific azo pigment into a photosensitive member as a charge generating material.

A photosensitive member provided according to the present invention contains a specific azo compound represented by the following formula (I)

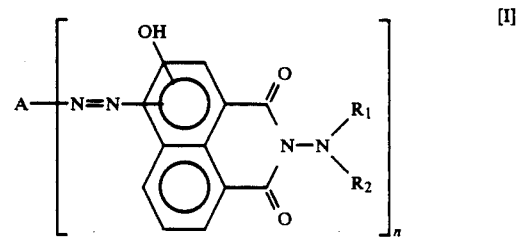

wherein A represents an aromatic hydrocarbon group or a heterocyclic group, which may be bonded through a bonding group; $R_1$ and $R_2$ are independently selected from the group consisting of hydrogen, a halogen atom, an alkyl group which may have a substituent, an aralkyl group which may have a substituent, an aryl group which may have a substituent, a condensed poly-cyclic group which may have a substituent and a hetero-cyclic group which may have a substituent; $R_1$ and $R_2$ may combinedly form a cyclic ring; and n represents an integer of 1, 2, 3 or 4.

An azo compound of the invention represented by the general formula (I) can be synthesized according to a known method. For example, a compound with n amino groups represented by the general formula (II)

wherein A and n are the same as above, may be reacted with sodium nitrite in hydrochloric acid to give an azo compound, which may be coupled with an appropriate coupler represented by the following general formula (III) in the presence of alkali. In a further method, the azo compound may be prepared by altering a compound with n amino groups to an azo compound, isolating it by an addition with an acid such as HBF₄, and then subjecting to a coupling reaction.

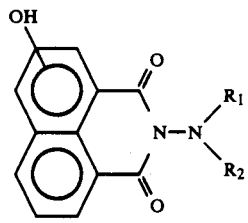

wherein $R_1$ and $R_2$ are the same as above.

Components of A in the general formula (I) of the invention are shown below with no significance in restricting the embodiments.

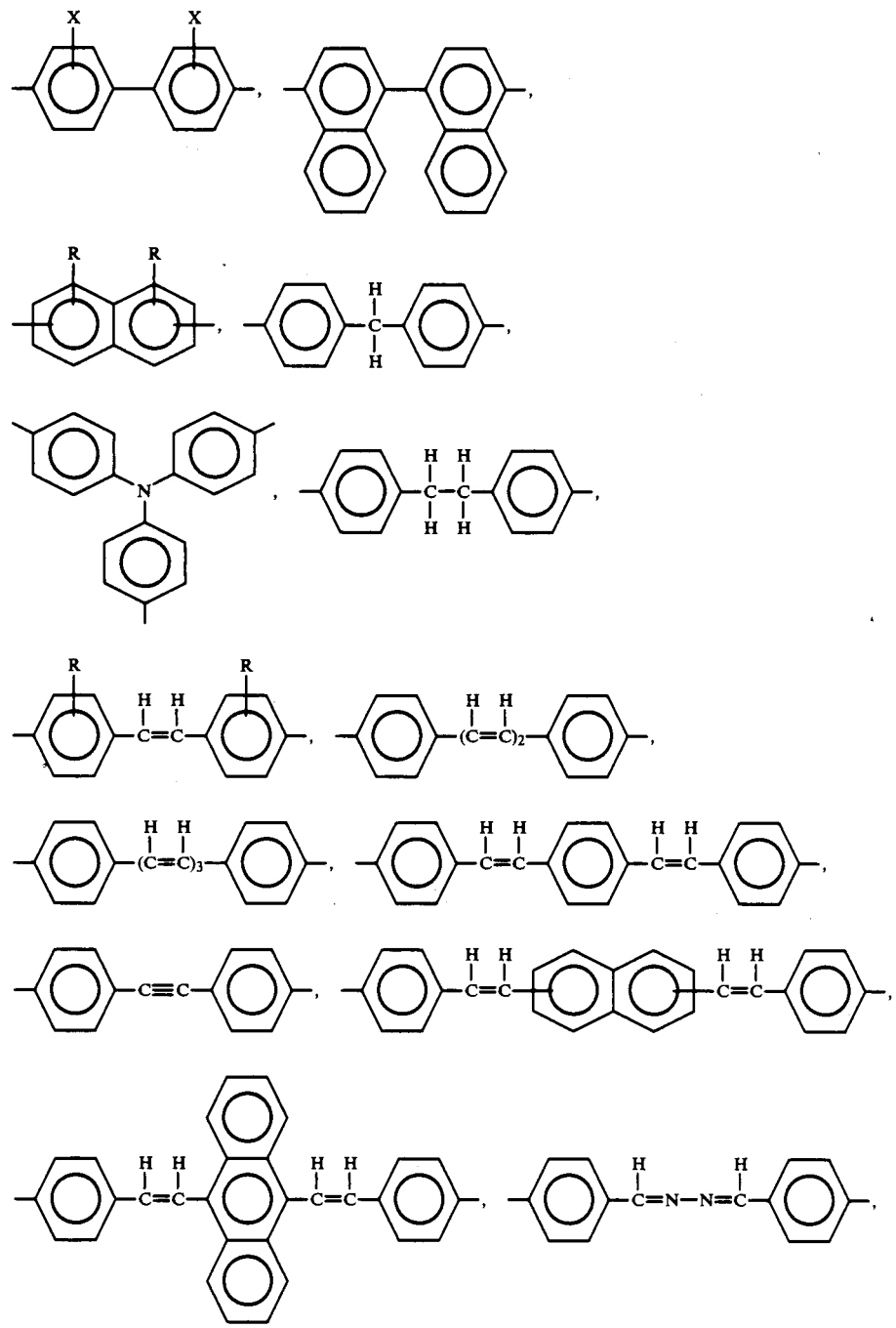

-continued
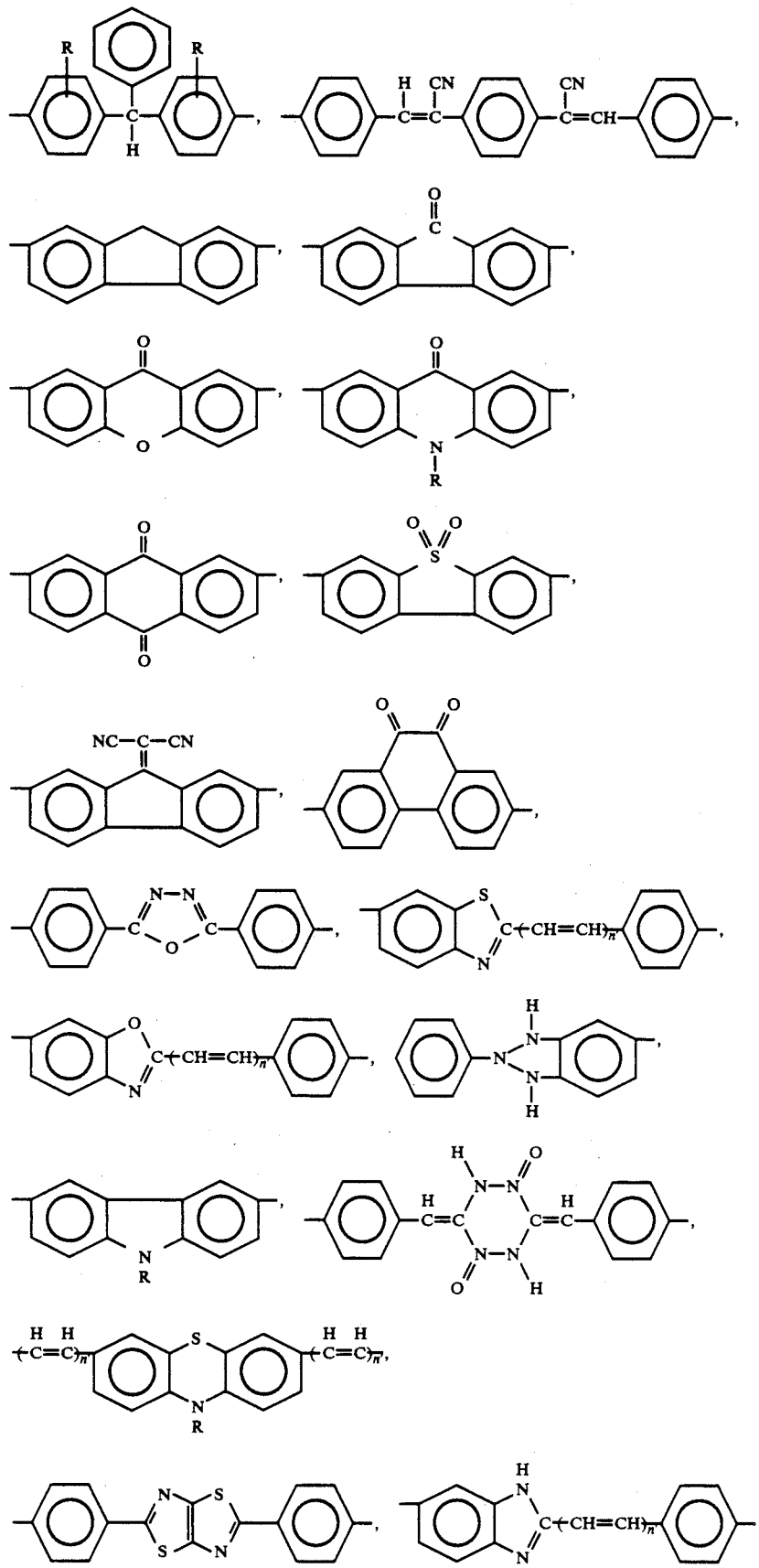

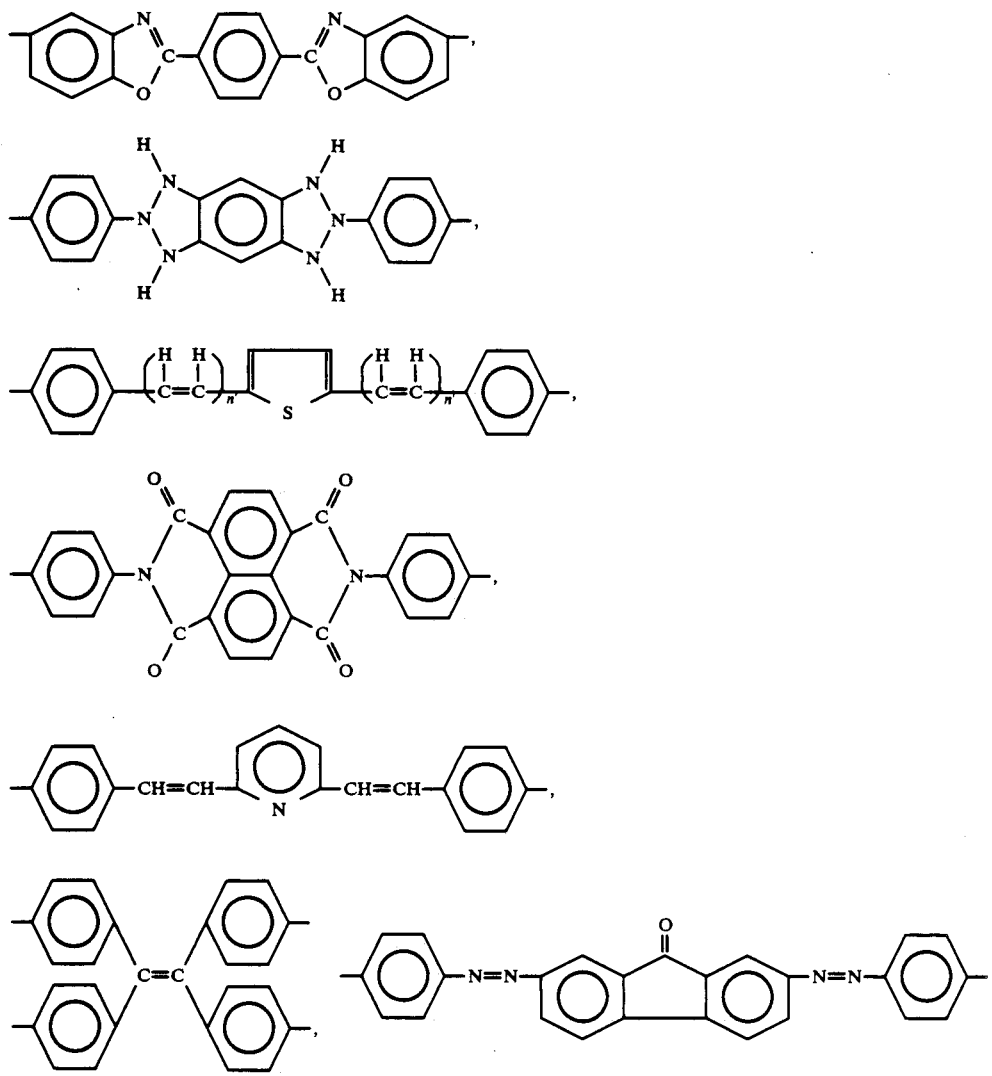

wherein X or R represents a halogen atom, hydrogen, an alkyl group or an alkoxyl group, and n' is an integer of 0 or 1.

A coupler component represented by the general formula (III) can be synthesized according to usual methods. That is, the coupler component may be prepared by condensing a hydroxy naphthalenedicarboxylic acid anhydride represented by the following general formula [IV];

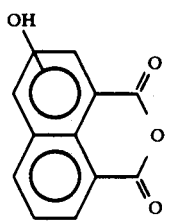

[IV]

with a hydrazine compound represented by the following general formula [V]

[V]

wherein $R_1$ and $R_2$ are the same as in (I) respectively.

A preferred coupler component of the invention represented by the general formula (III) is shown below, but with no significance in restricting the embodiments of the invention.

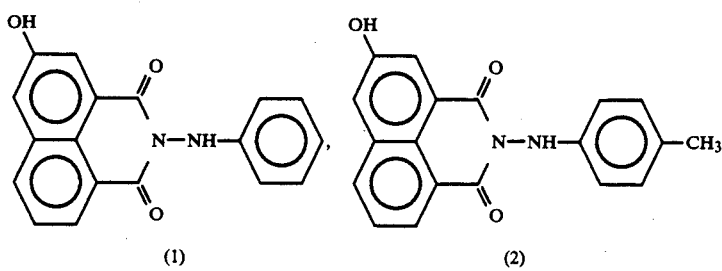
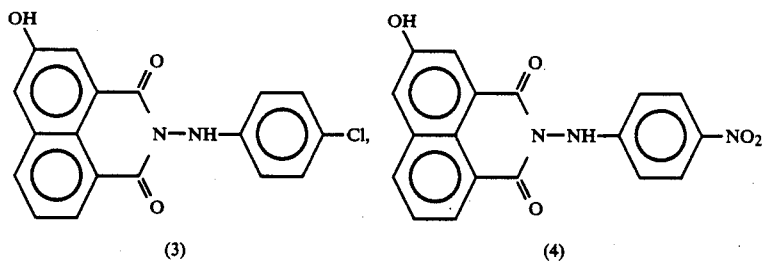
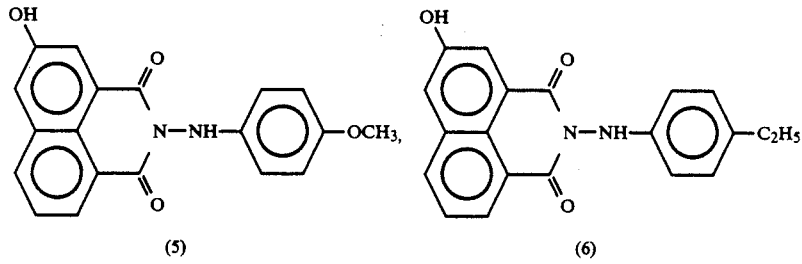
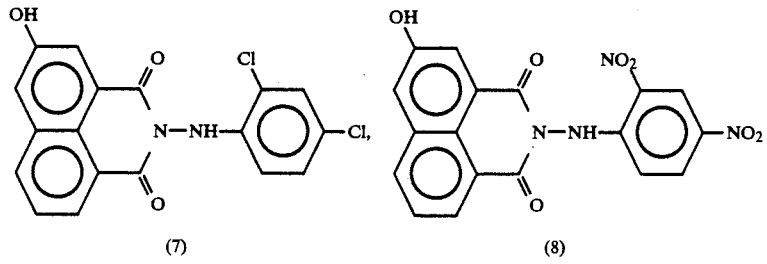
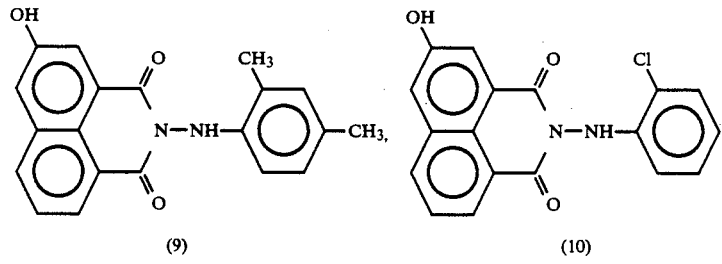
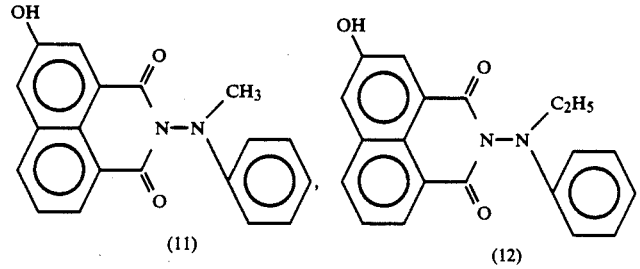

-continued
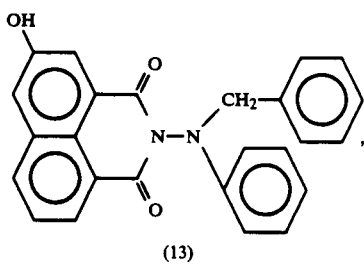
(13)
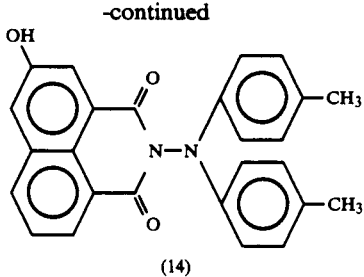
(14)
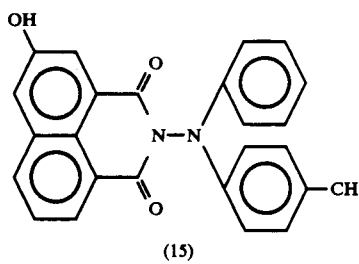
(15)
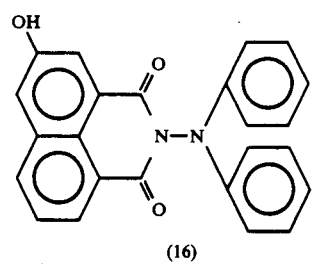
(16)
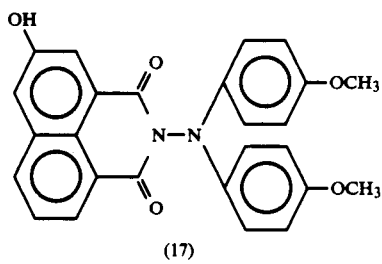
(17)
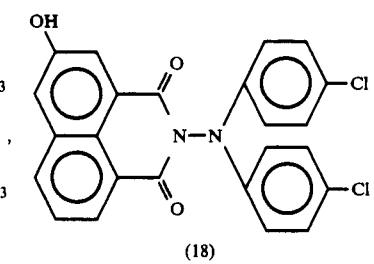
(18)
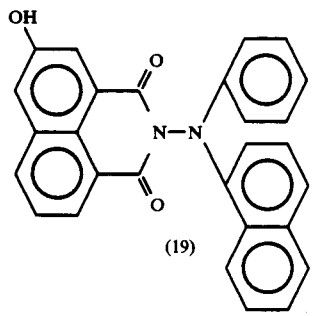
(19)
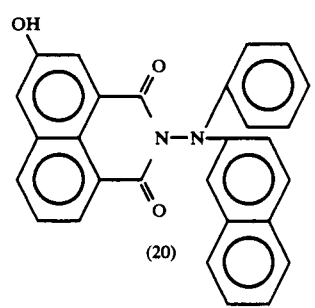
(20)
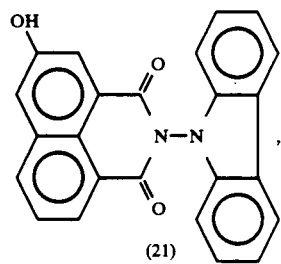
(21)
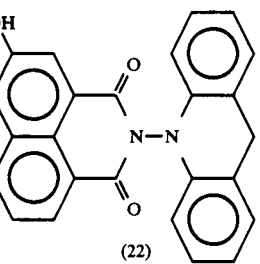
(22)
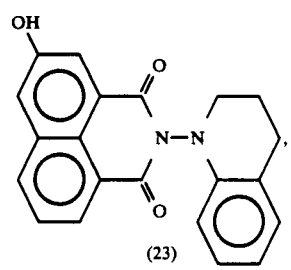
(23)
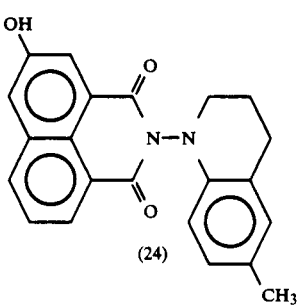
(24)

-continued

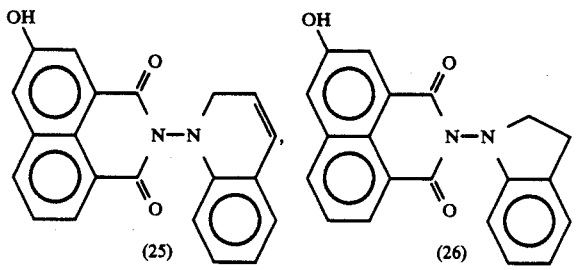

(25) (26)

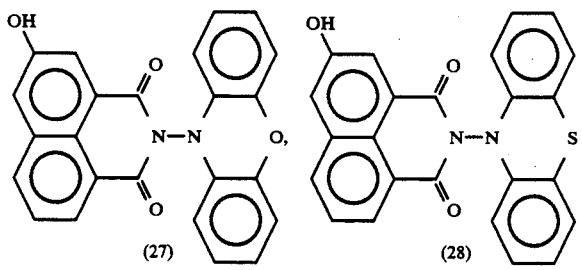

(27) (28)

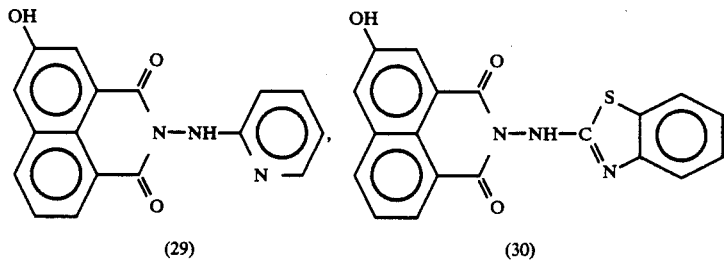

(29) (30)

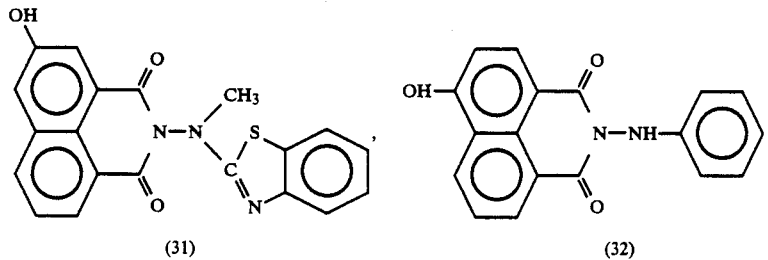

(31) (32)

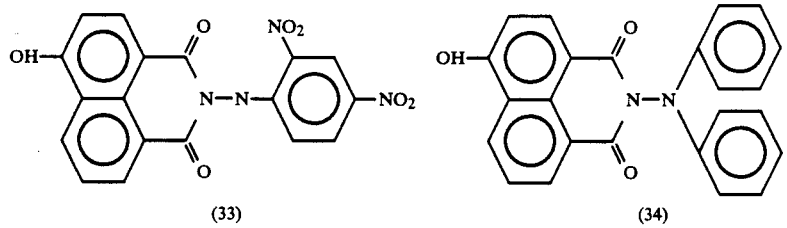

(33) (34)

A photosensitive member of the invention has a photosensitive layer comprising one or more kinds of azo compounds represented by the general formula [I] which is prepared by reacting azo components with coupler components as above mentioned. A photosensitive member, various types of which are known, may be any type in the invention. For example, a photosensitive member of the invention may be monolayer type in which a photosensitive layer is formed on an electrically conductive substrate by dispersing azo pigments in a resin binder or a charge transporting medium, or a laminated type in which first a charge generating layer containing mainly an azo pigment is formed on an electrically conductive substrate and then a charge transporting layer is formed on the charge generating layer. An azo pigment in a photosensitive member of the invention functions as a photoconductive material and generates charges with very high efficiency by absorbing light resulting in the improvement of sensitivity of a photosensitive member. The generated charges may be transported with an azo pigment as a medium, but more effectively with a charge transporting material as a medium.

In order to form a photosensitive member of a monolayer type, fine particles of azo pigments represented by the foregoing general formula (I) are dispersed in a resin solution or a solution containing a charge transporting compound and resin, which is coated on an electrically conductive substrate and dried. The thickness of the photosensitive layer is 3-30 μm, preferably 5-20 μm. The sensitivity is poor if the azo pigment is used in an insufficient quantity, whereas the chargeability is poor and the mechanical strength of photosensitive layer is inadequate if used to excess. Therefore, the amount of an azo pigment contained in a photosensitive layer is within the range of 0.01-2 parts by weight, preferably, 0.2-1.2 parts by weight on the basis of one part by weight of resin. If a charge transporting material such as polyvinylcarbazole, which is capable of being used as a binder itself, is used, an additional amount of an azo pigment is preferably 0.01-0.5 parts by weight on the basis of one part by weight of charge transporting materials.

In order to form a photosensitive member of a laminated type, an azo pigment is deposited in a vacuum on an electrically conductive substrate, an azo pigment is dissolved in an amine-containing solvent to apply onto an electrically conductive substrate or an application solution containing a pigment and, if necessary, binder resin dissolved in an appropriate solvent is applied onto an electrically conductive substrate to be dried, for the formation of a charge generating layer on the electrically conductve substrate. Then, a solution containing a charge transporting material and a binder is applied onto the charge generating layer followed by drying for the formation of a charge transporting layer. The thickness of the azo pigment-containing layer as a charge generating layer is 4 μm or less, preferably, 2 μm or less. It is suitable that the charge-transporting layer has a thickness in the range 3-30 μm, preferably 5-20 μm, and the proportion of charge transporting materials in the charge-transporting layer is 0.2-2 parts by weight, preferably 0.3-1.3 parts by weight on the basis of one part by weight of the binder. There is no need to use a binder when the charge-transporting material is of a high-polymer which is capable of serving as a binder itself.

Some examples of suitable binders for the production of a photosensitive member are thermoplastic resins such as saturated polyester, polyamide, acrylic, ethylene-vinyl acetate copolymer, ion cross-linked olefin copolymer (ionomer), styrene-butadiene block copolymer, polycarbonate, vinyl chloride-vinyl acetate copolymer, cellulose ester, polyimide, styrol, etc., and thermosetting resins such as, epoxy, urethane, silicone, phenolic, melamine, xylene, alkyd, thermosetting acrylic, etc., and photocuring resins, and photoconductive resins such as poly-N-vinyl carbazole, polyvinyl pyrene, polyvinyl anthracene, etc., all named without any significance of restricting the use to them. Any of these resins can be used singly or in combination with other resins. It is desirable for any of these electrically insulative resins to have a volume resistance of $1 \times 10^{12}$ Ωcm or more when measured singly.

A photosensitive member of the present invention permits, in combination with the binder, the use of a plasticizer, such as halogenated paraffin, polybiphenyl chloride, dimethyl naphthalene, dibutyl phthalate or 0-terphenyl, the use of an electron-attractive sensitizer, such as chloranyl, tetracyanoethylene, 2,4,7-trinitrofluorenone, 5,6-dicyanobenzoquinone, tetracyanoquinodimethane, tetrachlorphthalic anhydride, or 3,5-dinitrobenzoic acid, and the use of a sensitizer, such as methyl violet, rhodamine B, cyanine dye, pyrylium salt, and thiapyrylium salt. Applicable as a binder in the practice of this invention are any of the thermoplastic resins and thermosetting resins which are publicly known to be electrically insulative and any of the photocuring resins and photoconductive resins.

Illustrative examples of charge transporting materials for use in a photosensitive member, if necessary, are hydrazone compounds, pyrazoline compounds, styryl compounds, triphenylmethane compounds, oxadiazol compounds, carbazole compounds, stilbene compounds, enamine compounds, oxazole compounds, triphenylamine compounds, tetraphenylbenzidine, azine compounds and the like, including carbazole, N-ethylcarbazole, N-vinylcarbazole, N-phenylcarbazole, tethracene, chrysene, pyrene, perylene, 2-phenylnaphthalene, azapyrene, 2,3-benzochrysene, 3,4-benzopyrene, fluorene, 1,2-benzofluorene, 4-(2-fluorenylazo)resorcinol, 2-p-anisolaminofluorene, p-diethylaminoazobenzene, cadion, N,N-dimethyl-p-phenylazoaniline, p-(dimethylamino)stilbene, 1,4-bis(2-methylstyryl)benzene, 9-(4-diethylaminostyryl) anthracene, 2,5-bis(4-diethylaminophenyl)-1,3,5-oxadiazole, 1-phenyl-3-(p-diethylaminostyryl)-5-(p-diethylaminophenyl)-pylazoline, 1-phenyl-3-phenyl-5-pylazolone, 2-(m-naphtyl)-3phenyloxazole, 2-(p-diethylaminostyryl)-6-dietylaminobenzoxazole, 2-(p-diethylaminostyryl)-6-dietylaminobenzothiazole, bis(4-diethylamino-2-methylphenyl)phenylmethane, 1,1-bis(4-N,N-diethylamino-2-ethylphenyl)heptane, N,N-diphenylhydrazino-3-methylidene-10-ethylphenoxazine, N,N-diphenylhydrazino-3-methylidene-10-ethylphenothiazine, 1,1,2,2-tetrakis-(4-N,N-diethylamino-2-ethylphenyl)ethane, p-diethylaminobenzaldehyde-N,N-diphenylhydrazone, p-diphenylaminobenzaldehyde-N,N-diphenylhydrazone, N-ethylcarbazole-N-methyl-N-phenylhydrazone, p-diethylaminobenzaldehyde-N-α-naphthyl-N-phenylhydrazone, p-diethylaminobenzaldehyde-3-methylbenzothiazolinone-2 -hydrazone, 2-methyl-4-N,N-diphenylamino-β-phenylstilbene, α-phenyl-4-N,N-diphenylaminostilbene and the like. Any of these charge transporting materials can be used singly or in combination with other charge transporting materials.

A photosensitive member thus formed may have an undercoat layer such as an adhesion layer or a barrier layer between a substrate and a photosensitive layer. Examples of suitable material contained in these layers are polyimide, polyamide, nitrocellulose, polyvinyl butyral, polyvinyl alcohol, aluminium oxide and the like. It is preferable that the thickness of the layer is 1 μm or less.

An azo compound represented by the foregoing general formula [I] is effective, in particular, as a charge generating material used in a laminated-type photosensitive member.

[EXAMPLE ]

Specific examples are described below to show excellence of a photosensitive member of the invention in comparison with comparative examples.

First, there is shown a method of producing an azo pigment represented by the general formula (I) wherein the coupler component is that of the chemical formula (4). The other azo pigments of the general formula (I) can be synthesized similarly as described below.

EXAMPLE OF SYNTHESIS 3,3'-Dichlorobenzidine (2.53 g, 0.01 mole) was dispersed in hydrochloric acid (100 ml). The dispersion was stirred and cooled to 5° C., followed by the addition of an aqueous solution of sodium nitrite (1.4 g) in water (20 ml). Further, the mixture, which was being stirred, was cooled for one hour, and then filtered. Borofluoric acid (10 g) was added to the filtrate, and then crystals were grown. The obtained crystals were filtered to give 3,3'-dichlorobenzidine tetrafluoroborate.

Then, the resultant diazonium salt (3.49 g, 0.01 mole) and the coupling agent (6.98 g) represented by the foregoing coupling component (4) were dissolved in N-methylpyrrolidone (300 ml), to which a solution of sodium acetate (5 g) dissolved in water (100 ml) was added at 10°-20° C. for about 30 minutes. After addition, the solution was further stirred at room temperature for 3.0 hours to filtrate deposited crystals.

The resultant crystals were dispersed in DMF (1 liter), and the solution was stirred at room temperature for 3.0 hours, followed by filtration of the crystals. This operation was repeated two more times. Then, the crystals were washed with water and dried to give 7.9 g (81.2% of yield) of bisazo pigment. The obtained bisazo pigments were light-purple crystals.

The bisazo pigments were subjected to elemental analysis to compare the found values (%) with calculated values (%) of each element. The results were shown in Table 1.

TABLE 1

| element | element analysis | | |
|---|---|---|---|
| | C | H | N |
| found (%) | 59.10 | 2.52 | 14.45 |
| calcd. (%) | 59.02 | 2.67 | 14.39 |

EXAMPLE 1

The example used the bisazo compound as an azo pigment having the bisazo component A and the coupler component as shown below;

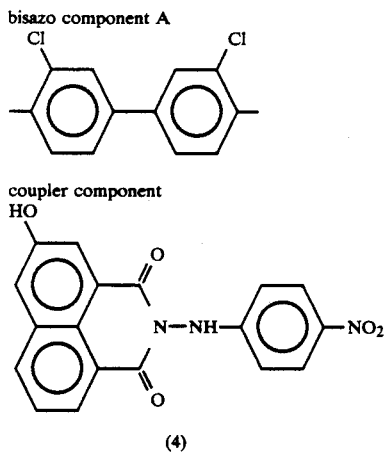

(4)

The bisazo compound of 0.45 part by weight, 0.45 part by weight of polyester resin (Vylon 200 made by TOYOBO K.K.) and 50 parts by weight of cyclohexanone were taken in Sand grinder for dispersion. The dispersion solution of the bisazo pigment was applied onto aluminotype-Mylar of 100 μm in thickness by a film applicator to form a charge generating layer so that a thickness of the dried layer would be 0.3 g/m². Then a solution of 7 parts by weight of p-diphenylaminobenzaldehyde-N,N-diphenylhydrazone and 7 parts by weight of polycarbonate resin (K-1300; made by TEIJIN KASEI K.K.) dissolved in 50 parts by weight of dioxane was applied onto the above formed charge generating layer to form a charge transporting layer so that the thickness of the dried layer would be 16 μm. Thus, a photosensitive member with two layers as a photosensitive layer was prepared.

EXAMPLES 2-4

Photosensitive members with two layers as a photosensitive layer were prepared in a manner similar to Example 1, except that azo pigments wherein coupler components were
  the component (5) (Example 2),
  the component (8) (Example 3),
  the component (10) (Example 4)
were used.

EXAMPLE 5-8

Photosensitive members with two layers as a photosensitive layer were prepared in a manner similar to Example 1, except that azo pigments wherein bisazo component A was

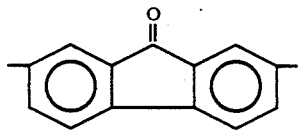

and coupler components were
  the component (3) (Example 5)
  the component (8) (Example 6)
  the component (16) (Example 7)
  the component (23) (Example 8)
were used.

EXAMPLE 9-12

Photosensitive members with two layers as a photosensitive layer were prepared in a manner similar to Example 1, except that azo pigments wherein bisazo component A was

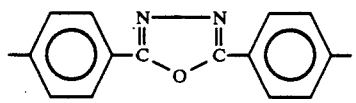

and coupler components were
  the component (8) (Example 9)
  the component (16) (Example 10)
  the component (19) (Example 11)
  the component (20) (Example 12)
were used and α-phenyl-4-N,N-diphenylaminostilbene was used as a charge transporting material for the formation of a charge transporting layer.

EXAMPLE 13-16

Photosensitive members with two layers as a photosensitive layer were prepared in a manner similar to Example 9, except that azo pigments wherein bisazo component A was

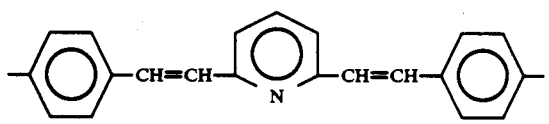

and coupler components were
 the component (1) (Example 13)
 the component (3) (Example 14)
 the component (15) (Example 15)
 the component (19) (Example 16)
were used.

COMPARATIVE EXAMPLE 1

Photosensitive member with two layers as a photosensitive layer was prepared in a manner similar to Example 1, except that the compound of the formula (V) below;

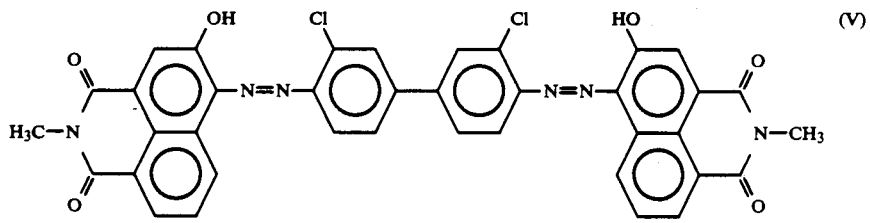

was used as a charge generating material.

COMPARATIVE EXAMPLE 2

Photosensitive member with two layers as a photosensitive layer was prepared in a manner similar to Example 1, except that the compound of the formula (VI) below;

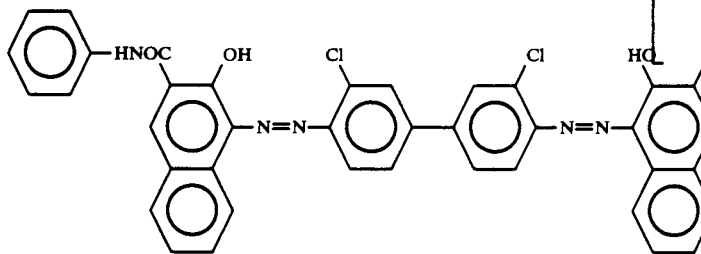

was used as a charge generating material.

An exposure value for half reducing (E½) were measured to evaluate sensitivity on the photosensitive members prepared in Examples 1-16, and Comparative Examples 1 and 2. The exposure value for half reducing, which is the exposure amount required for the surface potential to be half the value of the initial surface potential, is measured by first charging a photosensitive member by means of corona-discharge of −6.5 KV in the dark and then exposing the member to white light of 5 lux in illuminance.

The obtained results were shown in Table 2 below;

TABLE 2

|  | E½ (lux · sec) |  | E½ (lux · sec) |
| --- | --- | --- | --- |
| Example 1 | 3.5 | Example 9 | 3.4 |
| Example 2 | 3.7 | Example 10 | 3.5 |
| Example 3 | 3.1 | Example 11 | 3.0 |
| Example 4 | 3.3 | Example 12 | 2.8 |

TABLE 2-continued

|  | E½ (lux · sec) |  | E½ (lux · sec) |
| --- | --- | --- | --- |
| Example 5 | 2.7 | Example 13 | 3.5 |
| Example 6 | 2.9 | Example 14 | 3.0 |
| Example 7 | 3.0 | Example 15 | 3.2 |
| Example 8 | 3.2 | Example 16 | 3.4 |
| Comparative Example 1 | 10.2 | Comparative Example 2 | 6.3 |

As shown in Table 2, photosensitive members of the invention are excellent in electrophotographic properties, in particular, sensitivity because exposure values for half reducing (E½) of photosensitive members of Examples are much lower than those of Comparative Examples.

What is claimed is:

1. A photosensitive member with a photosensitive layer comprising an azo compound as a charge generating material represented by the following formula (I) on or over an electrically conductive substrate;

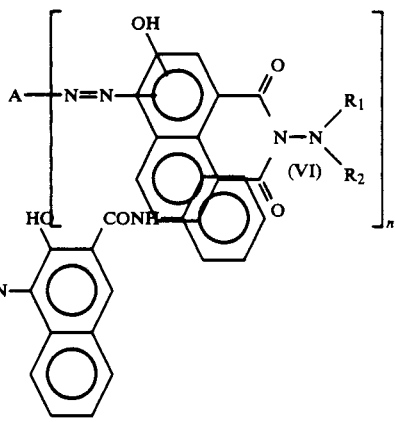

wherein A represents an aromatic hydrocarbon group or a heterocyclic group, which may be bonded through a bonding group; at least one of $R_1$ and $R_2$ is a cyclic group selected from the group consisting of an aryl group which may have a substituent, a condensed polycyclic group which may have a substituent and a heterocyclic group which may have a substituent; or $R_1$ and $R_2$ combinedly form a cyclic ring; and n represents an integer of 1, 2, 3 or 4.

2. A photosensitive member comprising a charge generating layer and a charge transporting layer on or over an electrically conductive substrate, wherein the charge generating layer comprises an azo compound represented by the following formula (I);

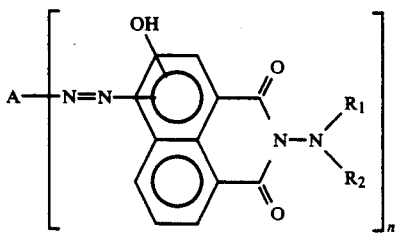

wherein A represents an aromatic hydrocarbon group or a heterocyclic group, which may be bonded through a bonding group; at least one of $R_1$ and $R_2$ is a cyclic group selected from the group consisting of an aryl group which may have a substituent, a condensed polycyclic group which may have a substituent and a heterocyclic group which may have a substituent; or $R_1$ and $R_2$ combinedly form a cyclic ring; and n represents an integer of 1, 2, 3 or 4.

3. A photosensitive member of claim 2, wherein the thickness of the charge generating layer is 4 μm or less.

4. A photosensitive member of claim 2, wherein the thickness of the charge transporting layer is within the range of between 3 and 30 μm 5. A photosensitive member of claim 2, wherein the charge transporting layer contains a charge transporting material dispersed in a binder resin.

6. A photosensitive member of claim 5, wherein the charge transporting material is contained at 0.2–2 parts by weight on the basis of one part of weight of the binder resin.

7. A photosensitive layer of claim 2, further comprising an undercoat layer on the electrically conductive substrate.

8. A photosensitive member with a photosensitive layer formed by dispersing a charge generating material and a charge transporting material in a binder resin on or over an electrically conductive substrate, wherein the charge generating material is an azo compound represented by the following general formula (I);

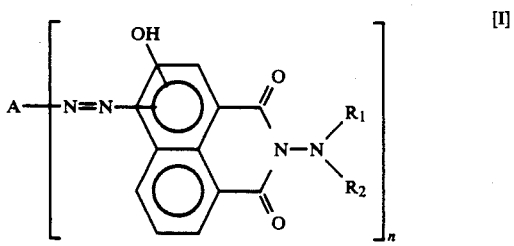

wherein A represents an aromatic hydrocarbon group or a heterocyclic group, which may be bonded through a bonding group; at least one of $R_1$ and $R_2$ is a cyclic group selected from the group consisting of an aryl group which may have a substituent, a condensed polycyclic group which may have a substituent and a heterocyclic group which may have a substituent; or $R_1$ and $R_2$ combinedly form a cyclic ring; and n represents an integer of 1, 2, 3 or 4.

9. A photosensitive member of claim 8, wherein the thickness of the photosensitive layer is within the range of between 3 and 30 μm.

10. A photosensitive member of claim 8, wherein the azo compound is contained at 0.01–2 parts by weight on the basis of one part by weight of the binder resin.

11. A photosensitive layer of claim 8, further comprising an undercoat layer on the electrically conductive substrate.

* * * * *